United States Patent
Coulmeau et al.

(10) Patent No.: US 9,329,045 B2
(45) Date of Patent: May 3, 2016

(54) METHOD FOR DETERMINING A RESULT PATH OF AN AIRCRAFT, ASSOCIATED DEVICE AND COMPUTER PROGRAM PRODUCT

(71) Applicant: THALES, Neuilly sur Seine (FR)

(72) Inventors: Francois Coulmeau, Seilh (FR); Arnaud Bonnafoux, Toulouse (FR); Nicolas Rossi, Toulouse (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/540,756

(22) Filed: Nov. 13, 2014

(65) Prior Publication Data

US 2015/0142221 A1    May 21, 2015

(30) Foreign Application Priority Data

Nov. 15, 2013   (FR) ..................................... 13 02628

(51) Int. Cl.
| | |
|---|---|
| *G01C 21/00* | (2006.01) |
| *G06F 19/00* | (2011.01) |
| *G01S 13/95* | (2006.01) |
| *G08G 5/04* | (2006.01) |
| *G05D 1/10* | (2006.01) |
| *G08G 5/00* | (2006.01) |

(52) U.S. Cl.
CPC ............... *G01C 21/00* (2013.01); *G01S 13/953* (2013.01); *G05D 1/101* (2013.01); *G08G 5/0052* (2013.01); *G08G 5/04* (2013.01)

(58) Field of Classification Search
USPC ........... 701/467, 533, 11, 122, 416, 425, 466, 701/3; 340/995.19, 995.21, 995.23
See application file for complete search history.

(56) References Cited

U.S. PATENT DOCUMENTS

| | | | |
|---|---|---|---|
| 6,246,957 B1 | 6/2001 | Barrer et al. | |
| 7,133,771 B1 | 11/2006 | Nesbitt | |
| 2008/0059058 A1* | 3/2008 | Caillaud | G05D 1/0202 701/467 |

FOREIGN PATENT DOCUMENTS

FR          2 905 480        3/2008

* cited by examiner

*Primary Examiner* — Adam Tissot
(74) *Attorney, Agent, or Firm* — Davidson, Davidson & Kappel, LLC

(57) ABSTRACT

A method for determining a result path of an aircraft, the result path including a set of successive positions of the aircraft between an initial global point and a final global point that are predetermined for a mission of the aircraft is provided.

The aircraft includes a plurality of calculating members, each able to guide the aircraft during at least part of the mission and to calculate an elementary path of the aircraft during that part, each elementary path including a set of successive positions of the aircraft between an initial elementary point and a final elementary point.

The device includes calculating a portion of the result path from elementary paths coming from at least two distinct calculating members.

11 Claims, 3 Drawing Sheets

METHOD FOR DETERMINING A RESULT PATH OF AN AIRCRAFT, ASSOCIATED DEVICE AND COMPUTER PROGRAM PRODUCT

This claims the benefit of French Patent Application FR13 026 28, filed Nov. 15, 2013 and hereby incorporated by reference herein.

The present invention relates to a method for determining a result path of an aircraft, the result path including a set of successive positions of the aircraft between an initial global point and a final global point that are predetermined for a mission of the aircraft, the aircraft including a plurality of calculating members, each calculating member being able to guide the aircraft during at least part of the mission and to calculate an elementary path of the aircraft during that part, each elementary path including a set of successive positions of the aircraft between an initial elementary point and a final elementary point, the method being implemented by a device for determining the result path connected to at least two distinct calculating members.

The present invention also relates to a computer program product including software instructions which, when implemented by a piece of computer equipment, carry out such a method.

The present invention also relates to a device for determining a result path of an aircraft.

BACKGROUND

An aircraft refers to any piloted vehicle capable of flying at least within the Earth's atmosphere, such as an airplane or a helicopter.

It is often essential to use several calculating members each determining at least part of the path of the aircraft in many current aircraft. Among these calculating members, a flight management system makes it possible to determine the path of the aircraft from takeoff to landing. Determining such a path plays a strategic role, and in particular makes it possible to estimate the quantity of fuel necessary to reach the final destination, the time remaining to that destination, and many other parameters. This path is generally displayed on a dedicated display screen.

However, the path of the aircraft calculated by the flight management system generally does not include tactical maneuvers of the aircraft. Such tactical maneuvers are necessary in parts of the aircraft's mission where its path cannot be determined in advance.

An example of such parts of the mission in particular relate to locations with high air traffic where guiding of the aircraft is done directly by the crew of the aircraft using other calculating members, such as automatic pilot. Thus, the flight management system sends the order to the automatic pilot, which then calculates a new tactical path of the aircraft based on the instructions entered by the crew. This new path is displayed on the display screen of the automatic pilot and generally includes only the last instruction from the crew, typically to command the airplane in the lateral axis (roll, heading, land route instruction for example), in the vertical axis (vertical speed, pitch, engine thrust instruction, for example) and an horizontal axis (velocity instruction, for example).

The calculating and display of these different paths is not, however, optimal.

SUMMARY OF THE INVENTION

It is an object of the present invention to provide a method for determining a result path of the aircraft that facilitates piloting of the aircraft by the crew.

The present invention provides a method of the aforementioned type for determining a result path of an aircraft, in which the method comprises calculating a portion of the result path from elementary paths resulting from at least two distinct calculating members.

According to other advantageous aspects of the invention, the method for determining a result path of an aircraft comprises one or more of the following features, considered alone or according to any technically possible combination(s):

each calculating member is chosen from the group consisting of: a flight management system, an automatic pilot, a taxi system, a traffic collision avoidance system, a terrain awareness and warning system, a weather radar and a traffic control system;

the method comprises a step for initializing a current result path from an elementary path resulting from a predetermined reference calculating member;

the reference calculating member used for the initialization step is a flight management system or a taxi system;

each calculating member comprises a predetermined hierarchical level, and the elementary path used to calculate a given portion of the result path is determined based on the hierarchical levels;

for each elementary path, the method comprises the following steps:

looking for an initial junction point on the current result path corresponding to the initial elementary point of the elementary path;

looking for a final junction point on the current result path corresponding to the final elementary point of the elementary path;

for an elementary path resulting from a calculating member with a hierarchical level higher than that of the reference calculating member, replacing the portion of the current result path between the initial junction point and the final junction point with that elementary path, in order to calculate a following result path;

for each elementary path, the method comprises the following steps:

looking for an initial junction point on the current result path corresponding to the initial elementary point of the elementary path;

looking for a final junction point on the current result path corresponding to the final elementary point of the elementary path;

for an elementary path resulting from a calculating member with a hierarchical level lower than or equal to that of the predetermined calculating member, the concatenation at the initial junction point of the portion of the current result path up to the initial junction point with the elementary path from that junction point, and/or the concatenation at the final junction point of the elementary path to the final junction point with the portion of the current result path from the final junction point, to calculate a following result path;

each initial elementary point and each final elementary point of each elementary path is defined by one or more parameters, those parameters being chosen from the group consisting of: the geometric coordinates of the aircraft, the distance between the aircraft and a predetermined point of the result path, the altitude of the aircraft, the speed of the aircraft and the passage of the aircraft at a predetermined point of the result; and the method further comprises a step for displaying the result path on a display screen of the aircraft.

The invention also relates to a computer program product including software instructions which, when implemented by a piece of computer equipment, carry out a method as defined above.

The invention generally relates to a device for determining a result path of an aircraft, the result path including a set of successive positions of the aircraft between an initial global point and a final global point that are predetermined for a mission of the aircraft, the aircraft including a plurality of calculating members, each being able to guide the aircraft during at least part of the mission and to calculate an elementary path of the aircraft during that part, each elementary path including a set of successive positions of the aircraft between an initial elementary point and a final elementary point, the device being connected to at least two distinct calculating members, and wherein the device comprises calculating element a portion of the result path from elementary paths coming from at least two distinct calculating members.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
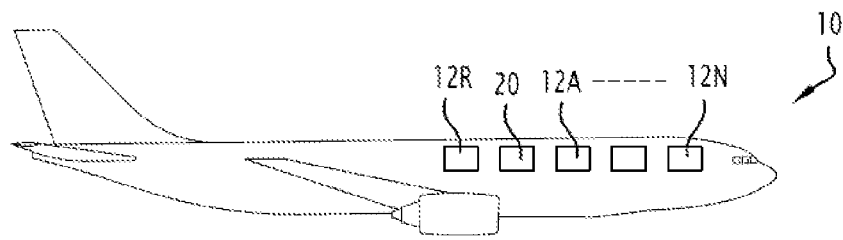
FIG. 1 is a diagrammatic view of an aircraft including a plurality of calculating members, each calculating member having a predetermined hierarchical level, and a device for determining a result path of the aircraft according to the invention.

An aircraft 10 is illustrated in FIG. 1. In the example embodiment shown in this FIG. 1, the aircraft 10 is an airplane able to be operated by a crew having one or more pilots.

The aircraft 10 is able to perform a mission corresponding to its nominal operation. The mission of the aircraft in particular includes an initial global point corresponding to the starting point of the aircraft 10, and a final global point corresponding to the arrival point of the aircraft 10. When the aircraft 10 is an airplane, its mission is for example a commercial flight including a departure airport and an arrival airport. Such a mission is made up of different parts for example corresponding to different flight phases, such as the takeoff, cruising or landing phases, or taxi phases.

The aircraft 10 includes a plurality of calculating members 12A to 12N, each able to guide the aircraft 10 during at least part of the mission.

When the aircraft 10 is an airplane, such a calculating member 12A to 12N is for example a flight management system (FMS), an automatic pilot (PA), a taxi system (TAXI), a traffic collision avoidance system (TCAS), a terrain awareness and warning system (TAWS), a weather radar (WXR), or a traffic controller (TC).

In FIG. 1, the aircraft 10 further includes a device 20 for determining a result path TR of the aircraft 10 according to the invention. The result path TR includes a set of successive positions of the aircraft 10 between an initial global point and a final global point that are predetermined for the mission of the aircraft 10. Thus, when the aircraft 10 is an airplane performing a commercial flight, the initial global point is the starting point of the airplane and the final global point is the arrival point of the airplane.

Each calculating member 12A to 12N comprises a predetermined hierarchical level NH. When several calculating members 12A to 12N are able to guide the aircraft 10 during the same part of the mission, such a hierarchical level NH in particular makes it possible to determine a single calculating member 12A to 12N to calculate the corresponding path for each part of the mission. In that case, the aircraft 10 is guided by the calculating member 12A to 12N for example having the highest hierarchical level NH.

Generally, a calculating member 12A to 12N with a hierarchical level NH is able to hand the guiding of the aircraft 10 to a calculating member 12A to 12N with a lower hierarchical level, and to resume guiding the aircraft 10 following that calculating member 12A to 12N to which guiding was temporarily entrusted or any other calculating member 12A to 12N with a lower hierarchical level NH. Thus, the calculating member 12A to 12N with the higher hierarchical level NH prevails over each calculating member 12A to 12N with a lower hierarchical level NH.

Figure 2:
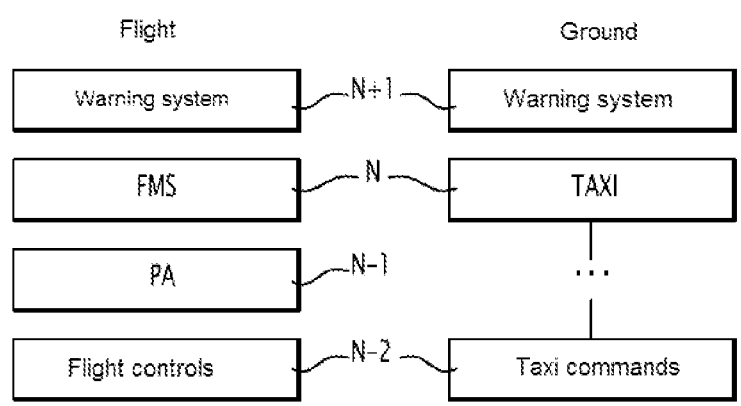
FIG. 2 is a flowchart showing different calculating members of the aircraft of FIG. 1 depending on their corresponding hierarchical levels.

In FIG. 2, a flowchart shows different hierarchical levels NH of avionics members 12A to 12N when the aircraft 10 is an airplane. As shown by this flowchart, when the airplane is in flight, warning systems, such as traffic collision avoidance systems (TCAS), have the highest hierarchical level N+1. The flight management system FMS has a hierarchical level N just below level N+1. The automatic pilot PA has a hierarchical level N−1 below the level N. The manual flight controls have the lowest hierarchical level N−2.

This flowchart in particular shows that when, for example, the automatic pilot PA and the traffic collision avoidance system TCAS are able to guide the airplane over a same part of the mission, the airplane will be guided by the traffic collision avoidance system TCAS until it hands control of the guiding to the automatic pilot PA.

Similarly, the flowchart of FIG. 2 shows that when the plane is on the ground, warning systems always have the highest hierarchical level N+1. The taxi system TAXI has hierarchical level N and the taxi controls have the lowest hierarchical level N−2.

Each calculating member 12A to 12N is suitable for calculating an elementary path $TE_1$ to $TE_N$ of the aircraft 10 during the part of the mission during which that calculating member 12A to 12N is able to guide the aircraft 10. Each elementary path $TE_1$ to $TE_N$ includes a set of successive positions of the aircraft 10 between an initial elementary point PI and a final elementary point PF respectively corresponding to the start point and the end point of said part of the mission of the aircraft 10.

Each calculating member 12A to 12N for example has a plurality of operating modes MF. An operating mode MF corresponds to a predetermined configuration of the calculating member 12A to 12N according to which the aircraft 10 is guided during at least part of an elementary path $TE_1$ to $TE_N$.

For example, when the aircraft 10 is an airplane, the flight management system FMS is able to calculate a lateral path of the aircraft 10 based on the geometry between the passage points to obtain driving modes of the aircraft 10. These driving modes are commonly referred to in the state of the art using the term "LEG" and are described in detail by aeronautic standard ARINC 702. These LEGs correspond to different operating modes MF of the flight management system FMS within the meaning of the term "operating mode" defined above.

Another example of these operating modes MF consists of different guide modes of the automatic pilot PA for example, guide modes in the vertical axis of the ALT type with altitude hold, the VNAV type with automatic pilot EP enslaved on the flight management system FMS, or of the MOT type with thrust hold, in the lateral axis of the heading, route, roll type for example. These guide modes also correspond to different operating modes MF of the automatic pilot PA within the meaning of the term "operating mode" defined above.

Each initial elementary point PI and each final elementary point PF of an elementary path $TE_1$ to $TE_N$ is defined by one or more parameters. These parameters are for example the geometric coordinates of the aircraft 10, the distance between the aircraft 10 and a predetermined point, the altitude of the aircraft 10, the speed of the aircraft 10, or the passage time of the aircraft 10 at a predetermined point.

Additionally, an initial elementary point PI or final elementary point PF of an elementary path $TE_1$ to $TE_N$ is defined by a change in operating mode MF of the corresponding calculating member 12A to 12N. The device 20 for determining the result path TR is connected to at least two distinct calculating members 12A to 12N and is able to receive at least one elementary path $TE_1$ to $TE_N$ from each of those distinct calculating members 12A to 12N.

Figure 3:
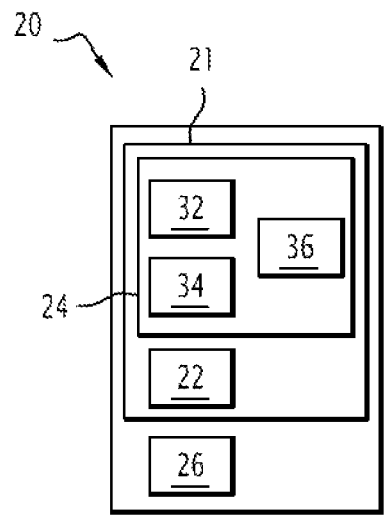
FIG. 3 is a diagrammatic view of the device for determining the result path of the aircraft of FIG. 1 in particular including a display screen.

In FIG. 3, the determining device 20 includes an information processing unit 21, for example formed by a processor 22 and a memory 24 associated with the processor 22. The determining device 20 includes a display screen 26.

The processor 22 is able to run different software applications that the memory 24 can store.

The memory 24 is able to store a reception software application 32 specific to a plurality of elementary paths $TE_1$ to $TE_N$ from at least two distinct calculating members 12A to 12N, and a plurality of operating modes MF corresponding to each elementary path $TE_1$ to $TE_N$.

The memory 24 is able to store a software application 34 for calculating the result path TR of the aircraft 10 from the elementary paths $TE_1$ to $TE_N$ received by the reception software 32. The detailed operation of the calculating software 34 will be explained in more detail below.

The memory 24 is further able to store software 36 for displaying the result path TR on the display screen 26, the display software 36 being connected to the calculating software 34. The display software 36 is further able to display operating modes MF of a corresponding calculating member 12A to 12N, on the corresponding portion of the result path TR.

Alternatively, the display screen 26 is part of another display screen of the aircraft 10. For example, when the aircraft 10 is an airplane, such a display screen is a navigation display (ND), a primary flight display (PFD), a flight mode annunciator (FMA), a vertical display (VD), a head up display (HUD), a multifunctional display (MFD), or an electronic flight bag (EFB).

Alternatively, the reception means 32, the calculating means 34 and the display means 36 are made in the form of programmable logic components, or in the form of dedicated integrated circuits.

Figure 4:
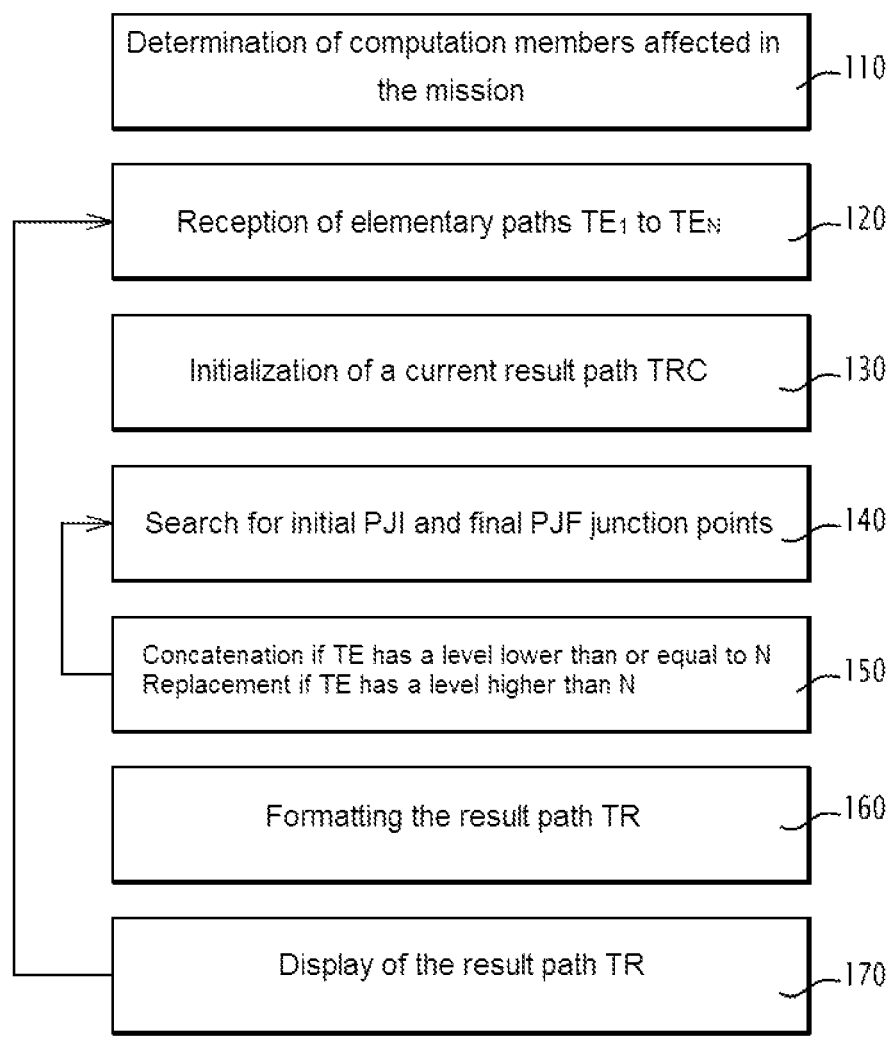
FIG. 4 is a flowchart of a method for determining the path of the aircraft according to the invention, the method being implemented by the device of FIG. 3.

The operation of the device 20 for determining the result path TR of the aircraft 10 will henceforth be explained using FIG. 4, showing a flowchart of a method 100 for determining the result path TR of the aircraft 10 according to the invention.

During an initial step 110, the calculating software 34 determines a set of avionics members 12A to 12N affected by the mission of the aircraft 10.

During step 120, the calculating software 34 receives a set of elementary paths $TE_1$ to $TE_N$ from each affected calculating member 12A to 12N.

Step 120 is launched by the calculating software 34 each time the context in which the aircraft 10 evolves is changed. Such a change in context is for example a change in the three-dimensional position of the aircraft 10 in space, a change in the measurements of the speed (vertical or horizontal), slope, heading of the aircraft 10, a change in the flight phase and/or flight procedure in progress, or a detection of the failure affecting the operation of the aircraft 10.

In practice, step 120 is launched with a frequency of 15 to 20 seconds.

During step 130, the calculating software 34 initializes a current result path TRC, from an elementary path $TE_1$ to $TE_N$ from a predetermined reference calculating member 12R. The reference calculating member 12R is chosen so that it includes the most complete elementary path $TE_1$ to $TE_N$ relative to other elementary paths $TE_1$ to $TE_N$.

Alternatively, the current elementary path TRC is initialized from several calculating members 12A to 12N having a same hierarchical level NH and being engaged on different parts of the mission. In that case, the current result path TRC is the concatenation of those elementary paths $TE_1$ to $TE_N$.

For example, when the aircraft 10 is an airplane, the current result path TRC is initialized from two reference calculating members, i.e., the flight management system FMS and the taxi system TAXI. The two systems have a same hierarchical level N, but can be engaged in different parts of the mission. The FMS is able to guide the airplane only during flight and the TAXI system is able to guide the airplane only on the ground. The current result path TRC is in the result of the concatenation of the two elementary paths at takeoff and landing points.

During step 140, for each received elementary path $TE_1$ to $TE_N$, the calculating software 34 determines, on the current result path TRC, an initial junction point PJI corresponding to the initial elementary point PI of that elementary path $TE_1$ to $TE_N$.

In that same step, the calculating software 34 determines, on the current result path TRC, a final junction point PJF corresponding to the final elementary point PF of the elementary path $TE_1$ to $TE_N$.

Such a search for a final junction point PJF or initial junction point PJI depends on parameters defining the corresponding initial elementary point PI or final elementary point PF.

Thus, for example, when an initial elementary point PI or final elementary point PF is defined by the geometric coordinates of the aircraft 10, the junction point PJI or PJF on the current result path TRC is the point of the current result path TRC geometrically closest to that initial elementary point PI or final elementary point PF.

When an initial elementary point PI or final elementary point PF is for example defined by the altitude of the aircraft 10, the junction point PJI or PJF on the current result path TRC is the point of the current result path TRC at which the estimated altitude of the aircraft 10 is closest to that defining that initial elementary point PI or final elementary point PF.

The search for a junction point PJI or PJF on the current result path TRC is done in a similar manner for an initial elementary point PI or final elementary point PF defined by the distance between the aircraft 10 and a predetermined point, by the speed of the aircraft 10, or by the passage time of the aircraft 10 at a predetermined point.

An example of determination of the initial PJI and final PJF junction points is shown below.

The evolution of the aircraft 10 during flight is defined by the following dynamic equation:

$$\sum \vec{F}_{ext} = m \cdot \frac{d\vec{V}}{dt} \quad (1)$$

wherein $\vec{F}_{ext}$ represents the outside forces applied to the aircraft 10, m represents the mass of the aircraft 10, and $\vec{V}$ represents its speed.

Projected on two horizontal and vertical axes, equation (1) is expressed by the following two equations:
in the horizontal plane:

$$m \cdot \frac{dV_x}{dt} = Tx - Fx - mg \cdot \sin\gamma \quad (2)$$

and in the vertical plane:

$$F_z = mg \cdot \cos\gamma \quad (3)$$

wherein Tx is the thrust, Fx is the drag, Fz is the lift, and $\gamma$ is the aerodynamics slope.

The lift is expressed by the following equation:

$$Fz = \frac{1}{2}\rho \cdot S \cdot V_{air}^2 \cdot C_z \quad (4)$$

where $\rho$ is the air density, S is the aerodynamic surface of the aircraft 10 (the surface of the wing, for example), $V_{air}$ is the airspeed and $C_z$ is a predetermined lift coefficient.

Likewise, the drag is expressed by the following relationship:

$$F_x = \frac{1}{2}\rho \cdot S \cdot V_{air}^2 \cdot C_x \quad (5)$$

wherein $C_x$ is a predetermined drag coefficient.

The drag Fx and the lift Fz of the aircraft 10 are connected by a same geometry of the aircraft 10. The lift $C_z$ and drag $C_x$ coefficients are therefore connected by an equation of type:

$$C_x = f(C_z) \quad (6)$$

The drag coefficient $C_x$ is generally determined empirically, using digital calculations or prior tests in a wind tunnel. This coefficient is generally expressed using a relationship of the type:

$$C_x = f(C_{x\_lisse}; C_{x\_conf(i)} \text{ with } i=1 \ldots N_{conf}; C_{x\_m}) \quad (7)$$

wherein $C_{x\_lisse}$ represents the drag of the aircraft 10 in the case where the aircraft is in the so-called smooth configuration, i.e., when the nose, wings, air brakes and landing gear are in; $C_{x\_conf(i)}$ with $i=1 \ldots N_{conf}$ represents the additional drag in the different possible aerodynamic situations on approach, i.e., with the leading edge slats and/or flaps and/or air brakes and/or landing gear are deployed; and $C_{x\_m}$ represents the drag caused by the aircraft mass; the function "f" generally being a simple weighted sum of the different coefficients.

The position of the aircraft, latterly (x) and vertically (z), is lastly calculated by integrating, based on the speed V and the aerodynamics slope $\gamma$ using the following two relationships:

$$dx/dt = V \cdot \cos\gamma, \text{ and } dz/dt = V \cdot \sin\gamma \quad (8)$$

The speed V, aerodynamics slope $\gamma$ and thrust $T_x$, variables are connected by equations (2) and (3). There is therefore a link between those three properties.

In practice, this means that the piloting of the aircraft 10 in the vertical plane is done by freezing two commands, the third being deduced from the equations described above. Several control modes in the vertical plane are thus implemented:

Fixed thrust and imposed speed mode; the result being the slope,

Fixed slope and imposed speed mode; the result being the thrust,

Fixed slope and imposed thrust mode; the result being the speed,

Fixed thrust and imposed acceleration/deceleration mode; the result being the slope.

Other control modes can be considered without going beyond the scope of the present invention.

In the lateral plane, the command is generally the roll, but other types of commands exist, such as different thrusts on each wing making it possible also to control the lateral plane of the aircraft.

The assembly of the commands in the lateral and vertical planes forms a command factor u. At each moment, the aircraft 10 has a status $x^u$ for example determining the current geometric position of the aircraft and corresponding to a command vector u.

The trajectory of the aircraft 10 during flight is determined based on the initial status $x_0$ of the aircraft 10, a cost criterion, and constraints.

The cost criterion is generally expressed by the relationship:

$$\inf_{\substack{u \in U \\ x^u(t_0) = x_0}} \int_{t_0}^{t_1} F(t, x^u(t), u(t)) dt \quad (9)$$

where U designates a set of command vectors u, $x^u$ the status of the aircraft 10 corresponding to the command vector u, and F a cost function to be minimized over a time interval $[t_0, t_1]$.

In commercial aviation, this criterion is generally reduced to a weight between a cost function F relative to fuel consumption (integral of the fuel flow rate), and total flight time.

The evolution of the command vector u over time thus includes degrees of freedom, that can be used to obtain an achievable path of the aircraft 10, and optionally optimal according to a criterion as defined above.

The equations for taxiing are similar to the preceding with the altitude in the direction z frozen at the altitude of the ground, i.e., the altitude of the airport where the taxiing is taking place.

An elementary path $TE_1$ to $TE_N$ is determined using the above equations, or simplified equations (depending on the time horizon sought or the required precision). These equations make it possible to estimate of final state of the aircraft 10 from a given initial state of the aircraft 10 for each elementary path $TE_1$ to $TE_N$. For each path $TE_1$ to $TE_N$, the initial state $x^u(t_0)$ makes it possible to determine the initial junction point PJI and the final state $x^u(t_1)$ makes it possible to determine the final junction point PJF.

For an elementary path $TE_1$ to $TE_N$ from a calculating member 12A to 12N with a hierarchical level higher than that of the reference calculating member 12R, the calculating software 34 then replaces, during step 150, the portion of the current result path TRC between the initial junction point PJI and the final junction point PJF with that elementary path $TE_1$ to $TE_N$, to calculate a following result path TRS.

For example, when the aircraft 10 is an airplane, with an elementary path $TE_1$ to $TE_N$ from the traffic collision avoidance system TCAS, the calculating software 34 then replaces the corresponding portion of the current result path TRC, initialized by the flight management system FMS, with a hierarchical level lower than that of the traffic collision avoidance system TCAS, with the elementary path from the TCAS system. The traffic collision avoidance system TCAS then takes control of the guiding of the airplane independently of the path defined by the flight management system FMS.

For an elementary path $TE_1$ to $TE_N$ from a calculating member 12A to 12N with a hierarchical level lower than or equal to that of the reference calculating member 12R, the calculating software 34 performs, during step 150, the concatenation, at the initial junction point PJI, of the portion of the current result path TRC to the initial junction point PJI with the elementary path $TE_1$ to $TE_N$ from that junction point PJI, to calculate a following result path TRS.

Alternatively or additionally, during step 150, the calculating software 34 performs a concatenation, at the final junction point PJF, of the elementary path $TE_1$ to $TE_N$ to the final junction point PJF with the portion of the current result path TRC from that final junction point PJF, to calculate a following result path TRS.

For example, when the aircraft 10 is an airplane with an elementary path $TE_1$ to $TE_N$ from the automatic pilot PA, the calculating software 34 does the concatenation of the current result path TRC with that elementary path $TE_1$ to $TE_N$ at the corresponding points, the current result path TRC being initialized by the FMS system with a hierarchical level higher than that of the automatic pilot PA. The flight management system FMS then passes control of the guiding of the airplane to the automatic pilot PA. In that case, the concatenation with the current result path TRC is done at both ends of the elementary path.

In this same example, if the current result path TRC is initialized only by the flight management system FMS, the elementary path $TE_1$ to $TE_N$ is provided by the taxi system TAXI having the same hierarchical level N. This elementary path $TE_1$ to $TE_N$ is then concatenated with the current result path TRC at the points corresponding to takeoff or landing of the airplane. In that case, the concatenation with the current result path TRC is done only at one end of the elementary path.

During step 160, the result path TR is then formed by the following result path TRS, and the calculating software 34 sends the obtained result path TR to the display software 36.

The display software 36 formats the result path TR in order to make it usable by the display screen 26. In particular, the display software 36 for example adds the operating modes MF of the calculating members 12A to 12N next to the corresponding portion of the result path TR.

Additionally, the display software 36 adds other information useful for guiding the aircraft 10 during the corresponding result path TR portion, such as weather conditions.

During step 170, the display screen 26 displays the result path TR with potential additional information added by the display software 38.

Figure 5:
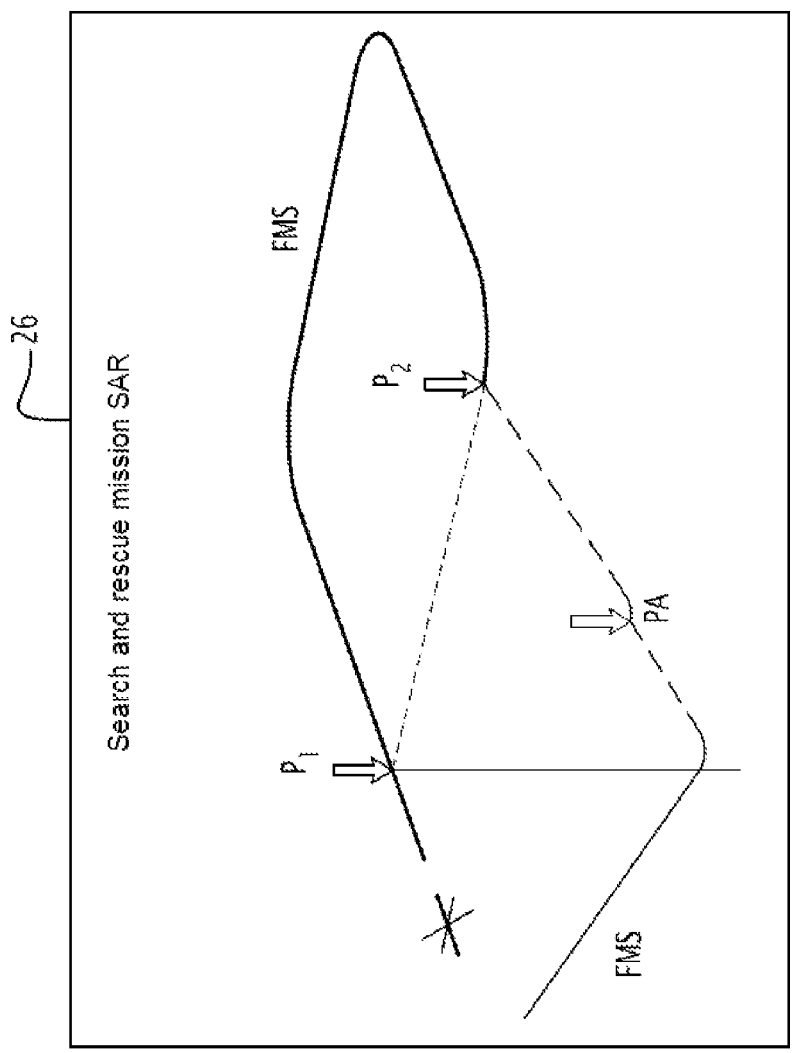
FIG. 5 is a diagrammatic depiction of data displayed on the display screen of FIG. 3.

One example of such a display is illustrated in FIG. 5, in the case of a result path TR for a helicopter, obtained for a search and rescue mission (SAR). The helicopter includes a flight management system FMS and an automatic pilot PA.

In FIG. 5, the flight management system FMS takes control of guiding of the aircraft 10 to perform the approach maneuver toward the point $P_1$ entered by the crew, at the vertical of a geographical zone toward which it must descend. The flight management system FMS then calculates the path to arrive at the correct heading and correct altitude to begin to descend at point $P_2$. Then, the flight management system FMS hands guiding control over to the automatic pilot PA to perform the descent maneuver toward the point $P_1$ at the search altitude. The automatic pilot PA retains authority during the performance duration of the search phase (sweeping the zone until an end moment or point, not embodied in the figure but known by those skilled in the art). Lastly, at that end-of-search point, the flight management system FMS resumes guiding control to perform the distancing maneuver.

The determination method 100 according to the invention thus makes it possible to obtain a result path TR for the entire mission of the aircraft 100. The method in particular makes it possible to complete the path of the aircraft 10 provided by the flight management system FMS that does not take into account tactical maneuvers by the aircraft 10, the path from the flight management system FMS for example being completed with paths from another calculating member, such as the automatic pilot PA.

The result path TR is continuous and includes additional information facilitating guiding of the aircraft 10. This in particular allows the crew to have a complete view of the current path of the aircraft 10 and its future path. This also makes it possible to give the crew information regarding changes in operating modes MF of different calculating members 12A to 12N.

This method also makes it possible to improve flight safety, since it replaces the current path of the aircraft 10 with that of a calculating member 12A to 12N with a higher hierarchical level NH if applicable.

One can thus see that the determination method and the determination device 20 according to the invention make it possible to facilitate piloting of the aircraft 10 by the crew by making it possible to display a more complete result path than the path provided by the flight management system FMS alone.

What is claimed is:

1. A method for determining a result path of an aircraft, the result path including a set of successive positions of the aircraft between an initial global point and a final global point that are predetermined for the mission of the aircraft, the aircraft including a plurality of calculating members, each calculating member being able to guide the aircraft during at least part of the mission and to calculate an elementary path of the aircraft during that part, each elementary path including a set of successive positions of the aircraft between an initial elementary point and a final elementary point, the method being carried out by a device for determining the result path connected to at least two distinct calculating members, the method comprising:
   calculating a portion of the result path from elementary paths resulting from at least two said distinct calculating members, each calculating member being included inside the aircraft, wherein each calculating member comprises a predetermined hierarchical level, and the elementary path used to calculate a given portion of the result path is determined based on the hierarchical levels.

2. The method as recited in claim 1 wherein each calculating member is chosen from the group consisting of: a flight management system, an automatic pilot, a taxi system, a traffic collision avoidance system, a terrain awareness and warning system, a weather radar and a traffic control system.

3. The method as recited in claim 1 further comprising initializing a current result path from an elementary path resulting from a predetermined reference calculating member.

4. The method as recited in claim 3 wherein the reference predetermined calculating member used for the initialization step is a flight management system or a taxi system.

5. A method for determining a result path of an aircraft, the result path including a set of successive positions of the aircraft between an initial global point and a final global point that are predetermined for the mission of the aircraft, the aircraft including a plurality of calculating members, each calculating member being able to guide the aircraft during at least part of the mission and to calculate an elementary path of the aircraft during that part, each elementary path including a set of successive positions of the aircraft between an initial elementary point and a final elementary point, the method being carried out by a device for determining the result path connected to at least two distinct calculating members, the method comprising:
  calculating a portion of the result path from elementary paths resulting from at least two distinct calculating members;
  initializing a current result path from an elementary path resulting from a predetermined reference calculating member,
  wherein each calculating member comprises a predetermined hierarchical level, and the elementary path used to calculate a given portion of the result path is determined based on the hierarchical levels.

6. The method as recited in claim 5 wherein the following steps for each elementary path are performed:
  looking for an initial junction point on the current result path corresponding to the initial elementary point of the elementary path;
  looking for a final junction point on the current result path corresponding to the final elementary point of the elementary path; and
  for an elementary path resulting from a calculating member with a hierarchical level higher than that of the reference calculating member, replacing the portion of the current result path between the initial junction point and the final junction point with that elementary path, in order to calculate a following result path.

7. The method as recited in claim 5 wherein the following steps for each elementary path are performed:
  looking for an initial junction point on the current result path corresponding to the initial elementary point of the elementary path;
  looking for a final junction point on the current result path corresponding to the final elementary point of the elementary path;
  for an elementary path resulting from a calculating member with a hierarchical level lower than or equal to that of the reference predetermined calculating member, the concatenation at the initial junction point of the portion of the current result path up to the initial junction point with the elementary path from that junction point, and/or the concatenation at the final junction point of the elementary path to the final junction point with the portion of the current result path from the final junction point, to calculate a following result path.

8. The method as recited in claim 1 wherein each initial elementary point and each final elementary point of each elementary path is defined by one or more parameters, the parameters being chosen from the group consisting of: the geometric coordinates of the aircraft, the distance between the aircraft and a predetermined point of the result path, the altitude of the aircraft, the speed of the aircraft and the passage of the aircraft at a predetermined point of the result path.

9. The method as recited in claim 1 further comprising displaying the result path on a display screen of the aircraft.

10. A computer program product comprising software instructions, the software instructions, when implemented by a computer, implementing the method according to claim 1.

11. A device for determining a result path of an aircraft, the result path including a set of successive positions of the aircraft between an initial global point and a final global point that are predetermined for a mission of the aircraft, the aircraft including a plurality of calculating members, each calculating member being able to guide the aircraft during at least part of the mission and to calculate an elementary path of the aircraft during that part, each elementary path including a set of successive positions of the aircraft between an initial elementary point and a final elementary point,
  the device being connected to at least two distinct calculating members, the device comprising:
  a calculating element for calculating a portion of the result path from elementary paths resulting from at least two said distinct calculating members, each calculating member being included inside the aircraft, wherein each calculating member comprises a predetermined hierarchical level, and the elementary path used to calculate a given portion of the result path is determined based on the hierarchical levels.

* * * * *